(12) United States Patent
Eberlein et al.

(10) Patent No.: US 10,642,609 B1
(45) Date of Patent: May 5, 2020

(54) INTEGRATING PREVIEW SYSTEMS FOR EARLY VALIDATION AND MAINTENANCE IN DEVELOPMENT-TO-PRODUCTION LANDSCAPES PROVISIONED BY CONTINUOUS DELIVERY

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/219,358

(22) Filed: Dec. 13, 2018

(51) Int. Cl.
*G06F 8/65* (2018.01)
*G06F 8/71* (2018.01)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 5,680,573 A | 10/1997 | Rubin et al. | |
| 5,925,100 A | 7/1999 | Drewry et al. | |
| 5,946,647 A | 8/1999 | Miller et al. | |
| 6,055,569 A | 4/2000 | O'Brien et al. | |
| 6,728,726 B1 | 4/2004 | Bernstein et al. | |
| 6,996,680 B2 | 2/2006 | Mogi et al. | |
| 7,284,096 B2 | 10/2007 | Schreter | |
| 7,523,142 B2 | 4/2009 | Driesen et al. | |
| 7,529,895 B2 | 5/2009 | Blumrich et al. | |
| 7,558,822 B2 | 7/2009 | Fredricksen et al. | |
| 7,657,575 B2 | 2/2010 | Eberlein et al. | |
| 7,720,992 B2 | 5/2010 | Brendle et al. | |
| 7,734,648 B2 | 6/2010 | Eberlein | |
| 7,739,387 B2 | 6/2010 | Eberlein et al. | |
| 7,894,602 B2 | 2/2011 | Mueller et al. | |
| 7,941,609 B2 | 5/2011 | Almog | |
| 7,962,920 B2 | 6/2011 | Gabriel et al. | |
| 7,971,209 B2 | 6/2011 | Eberlein et al. | |
| 8,126,919 B2 | 2/2012 | Eberlein | |
| 8,200,634 B2 | 6/2012 | Driesen et al. | |

(Continued)

OTHER PUBLICATIONS

U.S. Appl. No. 14/960,983, Eberlein, et al., filed Dec. 7, 2015.

(Continued)

*Primary Examiner* — Philip Wang
(74) *Attorney, Agent, or Firm* — Fish & Richardson P.C.

(57) ABSTRACT

A development maintenance (Dev-Maintain) computing system is upgraded from a release version n to a release version n+1, where a production (Prod) computing system is on the release version n, and a development preview (Dev-Preview) computing system is on the release version n+1. Changes are transported from the Dev-Preview computing system to the Dev-Maintain computing system. Inactive changes transported from the Dev-Preview computing system into the Dev-Maintain computing system are merged to generate merged changes. The merged changes are transported to the Dev-Preview computing system. A release version upgrade is performed to the Prod computing system and to the Dev-Preview computing system. Active changes are transported from the Dev-Maintain computing system to the Prod computing system.

17 Claims, 11 Drawing Sheets

(56) References Cited

U.S. PATENT DOCUMENTS

| | | | |
|---|---|---|---|
| 8,225,303 B2 | 7/2012 | Wagner et al. |
| 8,250,135 B2 | 8/2012 | Driesen et al. |
| 8,275,829 B2 | 9/2012 | Plamondon |
| 8,291,038 B2 | 10/2012 | Driesen |
| 8,301,610 B2 | 10/2012 | Driesen et al. |
| 8,302,160 B2 | 10/2012 | Hofmann et al. |
| 8,316,422 B2 | 11/2012 | Hofmann et al. |
| 8,321,678 B2 | 11/2012 | Hofmann et al. |
| 8,326,830 B2 | 12/2012 | Hollingsworth |
| 8,356,010 B2 | 1/2013 | Driesen |
| 8,375,130 B2 | 2/2013 | Eberlein et al. |
| 8,380,667 B2 | 2/2013 | Driesen |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,392,573 B2 | 5/2013 | Lehr et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,510,710 B2 | 8/2013 | Harren et al. |
| 8,543,994 B2 | 9/2013 | de Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,577,960 B2 | 11/2013 | Boller et al. |
| 8,600,916 B2 | 12/2013 | chen et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,525 B2 | 5/2015 | Harren et al. |
| 9,026,857 B2 | 5/2015 | Becker et al. |
| 9,031,910 B2 * | 5/2015 | Driesen .............. G06F 11/14 707/638 |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,436,724 B2 | 9/2016 | Driesen et al. |
| 9,724,757 B2 | 8/2017 | Barrett |
| 2004/0117398 A1 | 6/2004 | Idei et al. |
| 2006/0069715 A1 | 3/2006 | Vayssiere |
| 2006/0098253 A1 | 5/2006 | Masuno et al. |
| 2006/0179058 A1 * | 8/2006 | Bram .............. G06F 21/121 |
| 2008/0120129 A1 | 5/2008 | Seubert et al. |
| 2010/0023925 A1 | 1/2010 | Shribman et al. |
| 2010/0153341 A1 | 6/2010 | Driesen et al. |
| 2012/0089664 A1 | 4/2012 | Igelka |
| 2012/0284080 A1 | 11/2012 | Oliveira et al. |
| 2012/0290959 A1 * | 11/2012 | Quine .............. G06F 8/34 715/765 |
| 2013/0007259 A1 | 1/2013 | Pacheco-Sanchez et al. |
| 2013/0167079 A1 | 6/2013 | Ari et al. |
| 2013/0325672 A1 | 12/2013 | Odenheimer et al. |
| 2013/0332424 A1 | 12/2013 | Nos et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2016/0179497 A1 * | 6/2016 | Driesen .............. G06F 16/2379 717/169 |
| 2017/0025441 A1 | 1/2017 | Mori |
| 2017/0032050 A1 * | 2/2017 | Kol .............. G06F 17/2264 |
| 2017/0168801 A1 * | 6/2017 | Eberlein .............. G06F 8/65 |

OTHER PUBLICATIONS

U.S. Appl. No. 15/083,918, Eberlein, et al., filed Mar. 29, 2016.
U.S. Appl. No. 15/087,677, Eberlein, et al., filed Mar. 31, 2016.
U.S. Appl. No. 15/167,746, Burkhardt et al., filed May 27, 2016.
U.S. Appl. No. 15/285,715, Specht et al., filed Oct. 5, 2016.
U.S. Appl. No. 15/285,745, Mayer, filed Oct. 5, 2016.
U.S. Appl. No. 15/356,190, Eberlein, Peter, filed Nov. 18, 2016.
U.S. Appl. No. 15/461,236, Richter et al., filed Mar. 16, 2017.
U.S. Appl. No. 15/581,459, Eberlein, et al., filed Apr. 28, 2017.
U.S. Appl. No. 15/593,830, Eberlein, et al., filed May 12, 2017.
U.S. Appl. No. 15/847,627, de Boer, et al., filed Dec. 19, 2017.
U.S. Appl. No. 15/970,499, Eberlein, et al., filed May 3, 2018.
U.S. Appl. No. 16/173,225, Eberlein et al., filed Oct. 29, 2018.
U.S. Appl. No. 16/197,888, Meissner et al., filed Nov. 21, 2018.
U.S. Appl. No. 16/208,920, Eberlein, et al., filed Dec. 4, 2018.

* cited by examiner

INTEGRATING PREVIEW SYSTEMS FOR EARLY VALIDATION AND MAINTENANCE IN DEVELOPMENT-TO-PRODUCTION LANDSCAPES PROVISIONED BY CONTINUOUS DELIVERY

BACKGROUND

Traditionally, software release management for a proven combination of a production computing system and a development computing system is used to create changes for transport to the production computing system. In an environment with both a vendor and associated customers developing synergistic software, and where the production computing system is continuously updated with new software version from the vendor, both software developers and users wish to see the new software versions before the new software versions are used in a production computing system. A synchronization failure between the different software development efforts can result in software failures in not only the development computing system, but also in the production computing system.

SUMMARY

The present disclosure describes synchronization of changes between a two part development computing system and a production (Prod) computing system.

In an implementation, a development maintenance (Dev-Maintain) computing system is upgraded from a release version n to a release version n+1, where a production (Prod) computing system is on the release version n, and a development preview (Dev-Preview) computing system is on the release version n+1. Changes are transported from the Dev-Preview computing system to the Dev-Maintain computing system. Inactive changes transported from the Dev-Preview computing system into the Dev-Maintain computing system are merged to generate merged changes. The merged changes are transported to the Dev-Preview computing system. A release version upgrade is performed to the Prod computing system and to the Dev-Preview computing system. Active changes are transported from the Dev-Maintain computing system to the Prod computing system.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a three-tier computing system landscape is defined, with one part of the development computing system (the Dev-Maintain computing system) parallel with the Prod computing system at a same release version and with fast upgrade times. A second part of the development computing system (the Dev-Preview computing system) is also defined, which is integrated with the Dev-Maintain computing system to enable changes (for example, software and configuration) in both a current and a next release version of a continuously delivered software product. The Dev-Preview computing system is also upgraded to a new release version one release-cycle earlier than the Dev-Maintain computing system and the Prod computing system. Second, the described three-tier computing system landscape permits early test/validation and maintenance in a development-production computing system landscape where software and configuration changes are performed in the Dev-Maintain computing system on a same release version as the Prod computing system. Third, a Preview and Maintenance Controller (PMC) is defined, which controls an upgrade, merge, and transport sequence to optimize synchronization of development and maintenance and to minimize required time for development to production efforts. Fourth, with conventional computing system landscapes, development presents the following options:

1) A development computing system and a Prod computing system are available, where the development computing system and the Prod computing system are upgraded to a new release version at the same time. This configuration permits creation of changes in the development computing system and transport of the changes to the Prod computing system (as both are configured with the same release version)—but it does not creation of features in the development computing system for a new version of software that will execute after an upgrade. IN other words, "future" software can note be created and cannot react to changes in the Prod computing system,
2) The development computing system is upgraded some time (for example, weeks) prior to an upgrade of the Prod computing environment. This permits creation of changes that will run on the new version of the software—but it does not permit smaller changes to be transported to the Prod computing system in the time when development is already on the new release version and the Prod computing system is not (for example, the development computing system release version is newer than that in the Prod computing system and transport of software to a lower release version is not guaranteed to operate properly), or
3) The development computing system upgraded early and a maintenance computing system and the Prod computing system upgraded together. This configuration permits development for the new release version and small changes with fast delivery to the Prod computing environment on the same release version. However, this configuration has issues with merging small changes in the maintenance computing environment with larger changes in the development computing system.

The described three-tier computing system approach and methodology permits 1) and 2) and solves the problem presented by 3) to merge development performed in two computing systems. The described approach also ensures that merging changes performed in two computing systems are always performed on a computing system having a correct release version.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG.

Like reference numbers and designations in the various drawings indicate like elements.

DETAILED DESCRIPTION

Figure 1:
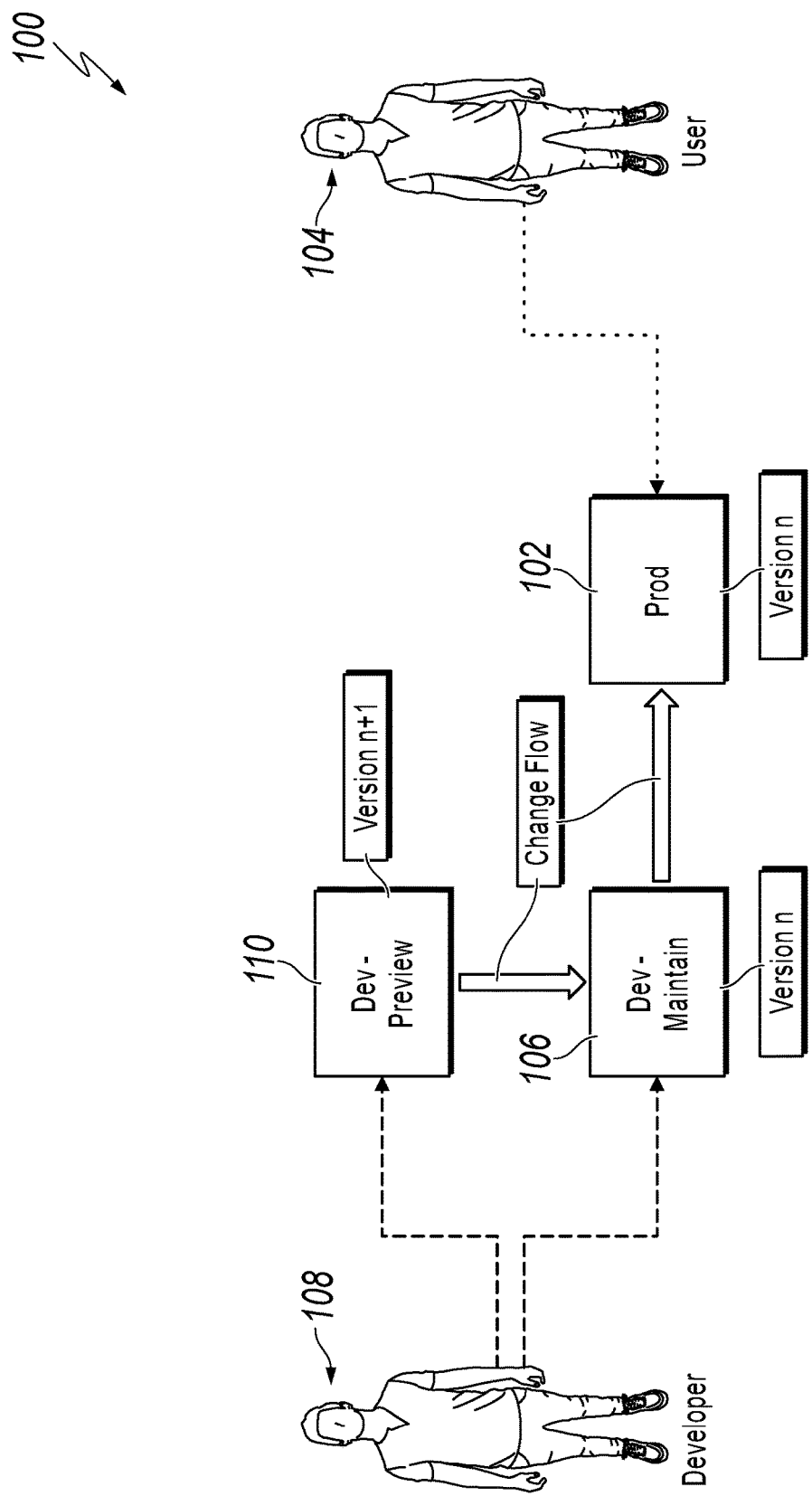
FIG. 1 is a block diagram illustrating an example of a three-tier computing system landscape, according to an implementation of the present disclosure.

The following detailed description describes synchronization of changes between a two-part development computing system and a production (Prod) computing system, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Traditionally, software release management for a proven combination of a Prod computing system and a development computing system that is used to create changes for transport (or deployment) to the Prod computing system. In an environment with both a vendor and associated customers developing synergistic software, and where the Prod computing system is continuously updated (such as, every week or month) with new software version from the vendor, software developers/users from both the vendor and customer wish to analyze, test, and validate new software versions before the new software versions are used in a Prod computing system (for example, to adapt to incompatible changes, request modifications from the software developers, or to test usability/functionality). In some cases, a customer using a vendor's software system may wish to create or to adjust extensions to or to include their own software (for example, as "add-ons") to a new software system version. A synchronization failure between the different software development efforts (for example, with respect to versions and features) can result in software failures, not only in development computing systems, but also in Prod computing systems. Such failures can result in, among other things, software inefficiencies, missed schedules, lost business, increased total cost of ownership, and customer dissatisfaction. This creates a challenge to integrate a development preview (Dev-Preview) computing system in the proven development computing system to Prod computing system infrastructure.

With conventional computing system landscapes, development presents the following options:

1) A development computing system and a Prod computing system are available, where the development computing system and the Prod computing system are upgraded to a new release version at the same time. This configuration permits creation of changes in the development computing system and transport of the changes to the Prod computing system (as both are configured with the same release version)—but it does not creation of features in the development computing system for a new version of software that will execute after an upgrade. IN other words, "future" software can note be created and cannot react to changes in the Prod computing system, 2) The development computing system is upgraded some time (for example, weeks) prior to an upgrade of the Prod computing environment. This permits creation of changes that will run on the new version of the software—but it does not permit smaller changes to be transported to the Prod computing system in the time when development is already on the new release version and the Prod computing system is not (for example, the development computing system release version is newer than that in the Prod computing system and transport of software to a lower release version is not guaranteed to operate properly), or 3) The development computing system upgraded early and a maintenance computing system and the Prod computing system upgraded together. This configuration permits development for the new release version and small changes with fast delivery to the Prod computing environment on the same release version. However, this configuration has issues with merging small changes in the maintenance computing environment with larger changes in the development computing system.

The described three-tier approach and methodology permits 1) and 2) and solves the problem presented by 3) to merge development performed in two computing systems. The described approach also ensures that merging changes performed in two computing systems are always performed on a computing system having a correct release version.

At a high-level, the disclosure defines a three-tier computing system landscape, with one part of the development computing system (a development maintenance (Dev-Maintain) computing system) parallel with the Prod computing system at a same release version and with fast upgrade times to permit fast changes in the Dev-Maintain computing system and transport of changes to the Prod computing system after testing. A second part of the development computing system (a development preview (Dev-Preview) computing system) is also defined, which is integrated with the Dev-Maintain computing system to enable changes in both a current and a next release version of a continuously delivered software product. The Dev-Preview computing system is also upgraded to a new release version one release-cycle earlier than the Dev-Maintain computing system and the Prod computing system (for example, if the new release version is delivered every week, the Dev-preview computing system is upgraded to the new release version one week before Dev-Maintain computing system and Prod computing system). Therefore, development and maintenance can be performed on two separate release versions for one Prod computing system. The described three-tier computing system landscape permits synchronization between the Dev-Maintain computing system and Dev-Preview computing system with respect to an established upgrade schedule, and also enables handling of potentially conflicting changes. In other words, early validation and maintenance can be performed in a development-production computing system landscape where software and configuration changes are performed in a Dev-Maintain computing system on a same release version as a Prod computing system.

The three-tier computing system landscape also defines a Preview and Maintenance Controller (PMC). The PMC controls an upgrade, merge, and transport sequence for the described three-tier computing system landscape. The PMC is used to optimize synchronization of development and maintenance efforts and to minimize required time for development to production efforts.

Turning to FIG. 1, FIG. 1 is a block diagram illustrating an example of a three-tier computing system landscape 100, according to an implementation of the present disclosure. As illustrated in FIG. 1, Prod computing system 102 is currently at a release version (n), which is used by User 104. Changes to the Prod computing system 102 are transported from Dev-Maintain 106, which is also at release version (n).

In one example, the Dev-Maintain computing system 106 can be used by a Developer 108 to perform changes (for example, software and configuration) while not depending on a future software release on the Dev-Maintain computing system 106 to be transported quickly to the Prod computing system 102. In this example, the changes can be transported from the Dev-Maintain computing system 106 to the Prod computing system 102 directly.

In another example, the Developer 108 needs to perform changes to software on where the changes are dependent on a future software release. In this case, the Developer 108 uses the Dev-Preview computing system 110 (at software release n+1) to make changes to the n+1 software release. The changes are transported to the Dev-Maintain computing system 106 and then to the Prod computing system 102. The idea is to keep the Dev-Preview computing system 110 at a release version (here, n+1) higher than the Dev-Maintain computing system 106 and the Prod computing system 102. The Dev-Maintain computing system 106 and the Prod computing system 102 are updated one release cycle later than the Dev-Preview computing system 110.

Figure 2:
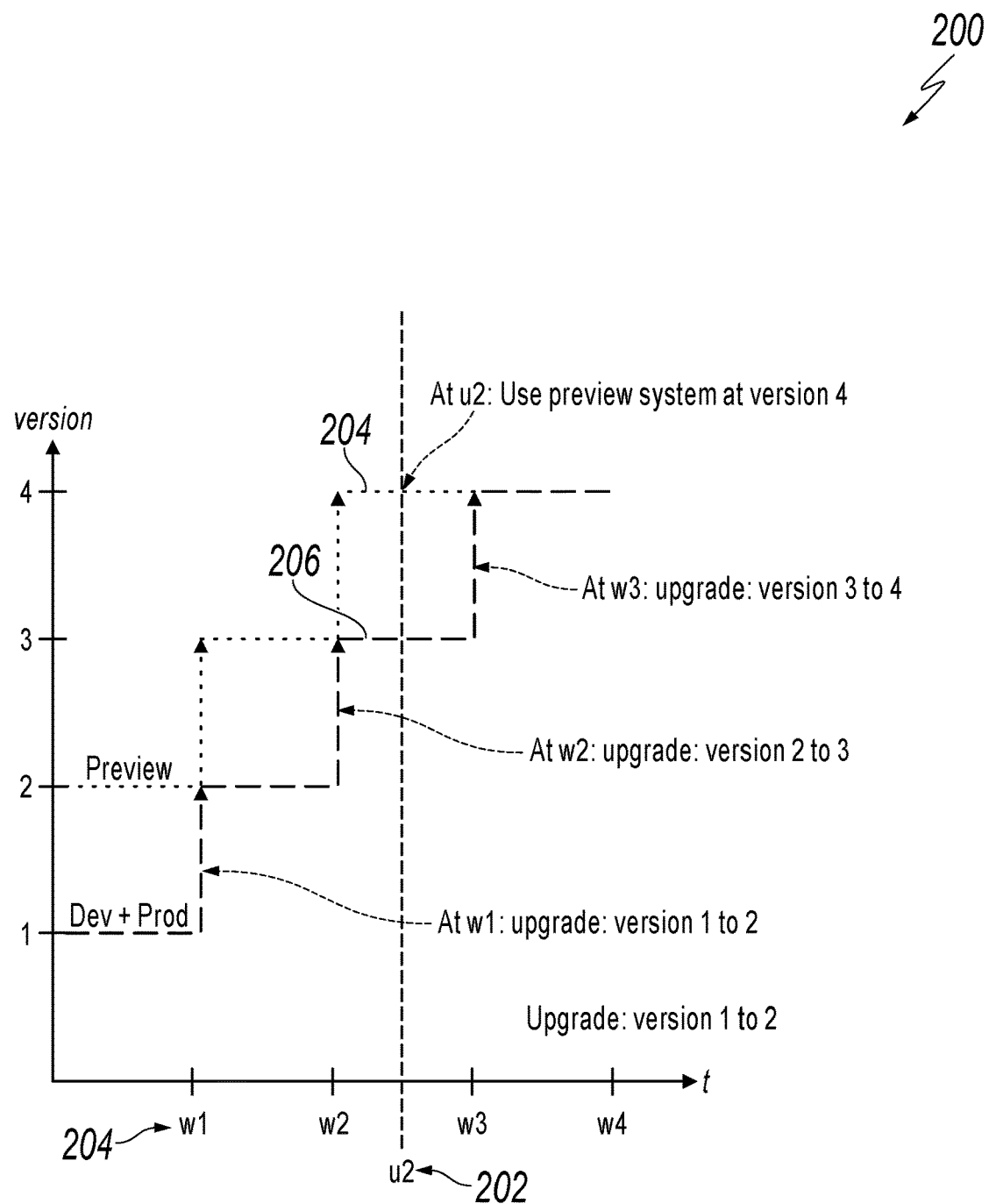
FIG. 2 is a graph illustrating a desired release version relationship, according to an implementation of the present disclosure.

Turning now to FIG. 2, FIG. 2 is a graph 200 illustrating a desired release version relationship, according to an implementation of the present disclosure. For example, with respect to the discussion of FIG. 1, at a given point-in-time 202 (here, u2) intermediate to indicated times w1, w2, w3, w4 (collectively 204) (for example indicating week 1, week 2, week 3, and week 4), the Dev-Preview computing system (for example, 110 in FIG. 1) release version value 204 is 4 (that is, n+1) with respect to the Dev-Maintain computing system (for example, 106 in FIG. 1) release version value 206 of 3 (here, n).

However, the question becomes how changes are transported from the Dev-Preview computing system to the Prod computing system (for example, the Prod computing system 102 in FIG. 1). A change created on a newer release version cannot be transported to a computing system on an earlier release version (because, for example, used application programming interfaces (APIs) may not yet be available). Therefore, the change can only be brought from the Dev-Preview computing system to the Prod computing system when the Prod computing system is upgraded to the newer release version. However, this is also the same time that the Dev-Preview is about to be upgraded to the next release version, so there is only a small timeframe where both the Dev-Preview computing system and the Prod computing system are on the same release version and transports between these computing systems can actually take place.

However, in the Dev-Maintain computing system, the same data objects may have been modified to satisfy needs in the Prod computing system on the older release version. Therefore, data objects may have been changed on both release versions (that is, in the Dev-Maintain computing system on the current release version and in the Dev-Preview computing system on the future release version. It is required to merge these changes to create one version, which can be transported to the Prod computing system and which also serves as the basis for further development. The merge method is configured to ensure that a merge is propagated to all computing systems and which permits follow-up changes (if any) in both the Dev-Maintain computing system and the Dev-Preview computing system.

Figure 3:
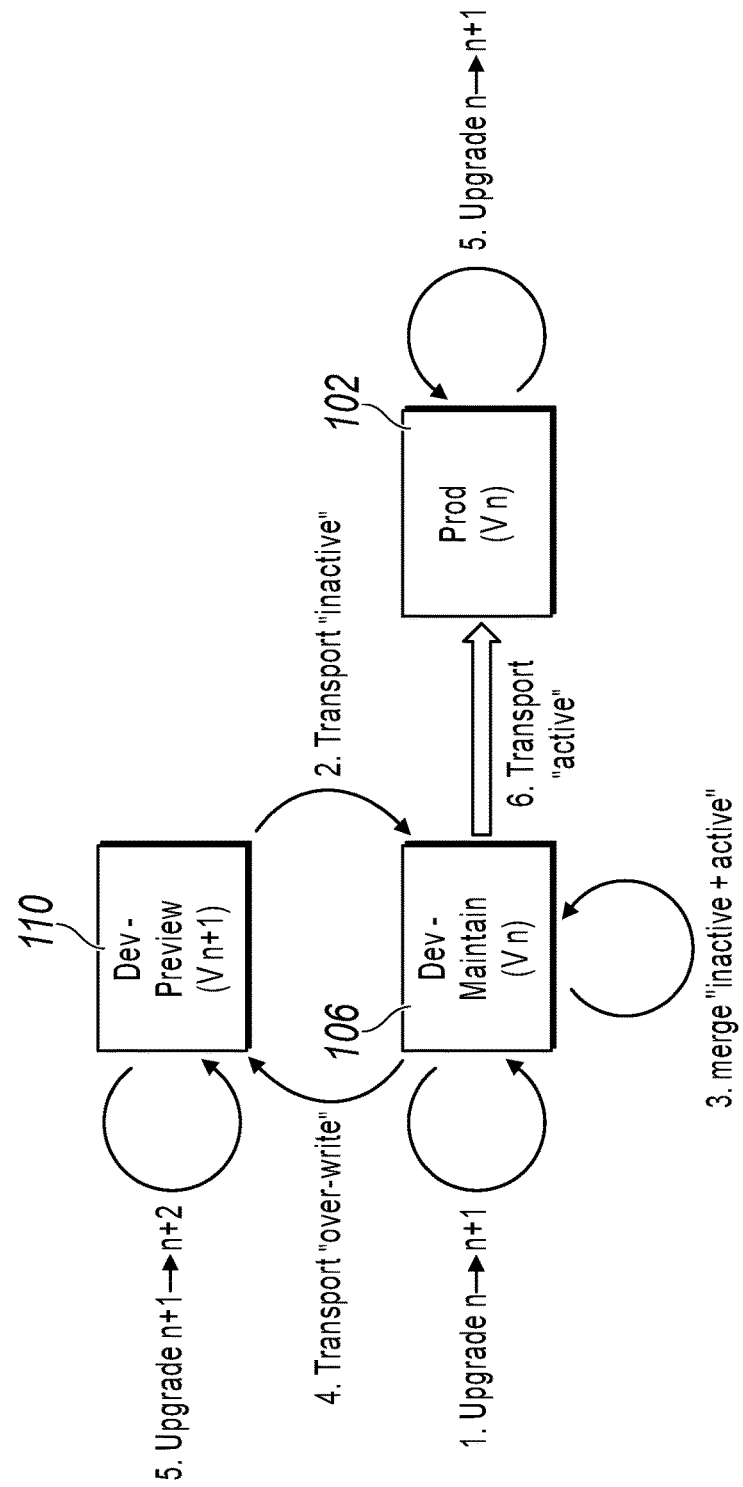
FIG. 3 is a block diagram illustrating an example of a merge method, according to an implementation of the present disclosure.

Referring to FIG. 3, FIG. 3 is a block diagram illustrating an example of a merge method 300, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

The merge method 300 is defined to orchestrate upgrades, transport, and merge of changes in the described three-tier computing system landscape 100. For the purposes of this example, the Prod computing system 102 is on release version n, the Dev-Maintain computing system 106 is on release version n, and the Dev-Preview computing system 110 is on release version n+1.

At step 1, the Dev-Maintain computing system 106 is upgraded to release n+1. From step 1, method 300 proceeds to step 2.

At step 2, changes are transported from the Dev-Preview computing system 110 to the Dev-Maintain computing system 106. The changes are an inactive form if the changes collide with changes already performed in the Dev-Maintain computing system 106. The changes are in an active form if the changes do not collide with changes already performed in the Dev-Maintain computing system 106. From step 2, method 300 proceeds to step 3.

At step 3, the transported inactive changes are merged into the Dev-Maintain computing system 106. From step 3, method 300 proceeds to step 4.

At step 4, the merged changes are transported to the Dev-Preview computing system 110 with an "overwrite" parameter set (for example, to true). This ensures that the Dev-Preview computing system 110 also includes the merged version of data objects on the Dev-Maintain computing system 106. From step 4, method 300 proceeds to step 5.

At step 5, a release version upgrade is performed. Here, the Prod computing system 102 is upgraded to release version n+1 and the Dev-Preview computing system 110 is upgraded to release version n+2. From step 5, method 300 proceeds to step 6.

At step 6, active changes are transported from the Dev-Maintain computing system 106 to the Prod computing system 102. After step 6, method 300 can stop.

Figure 4:
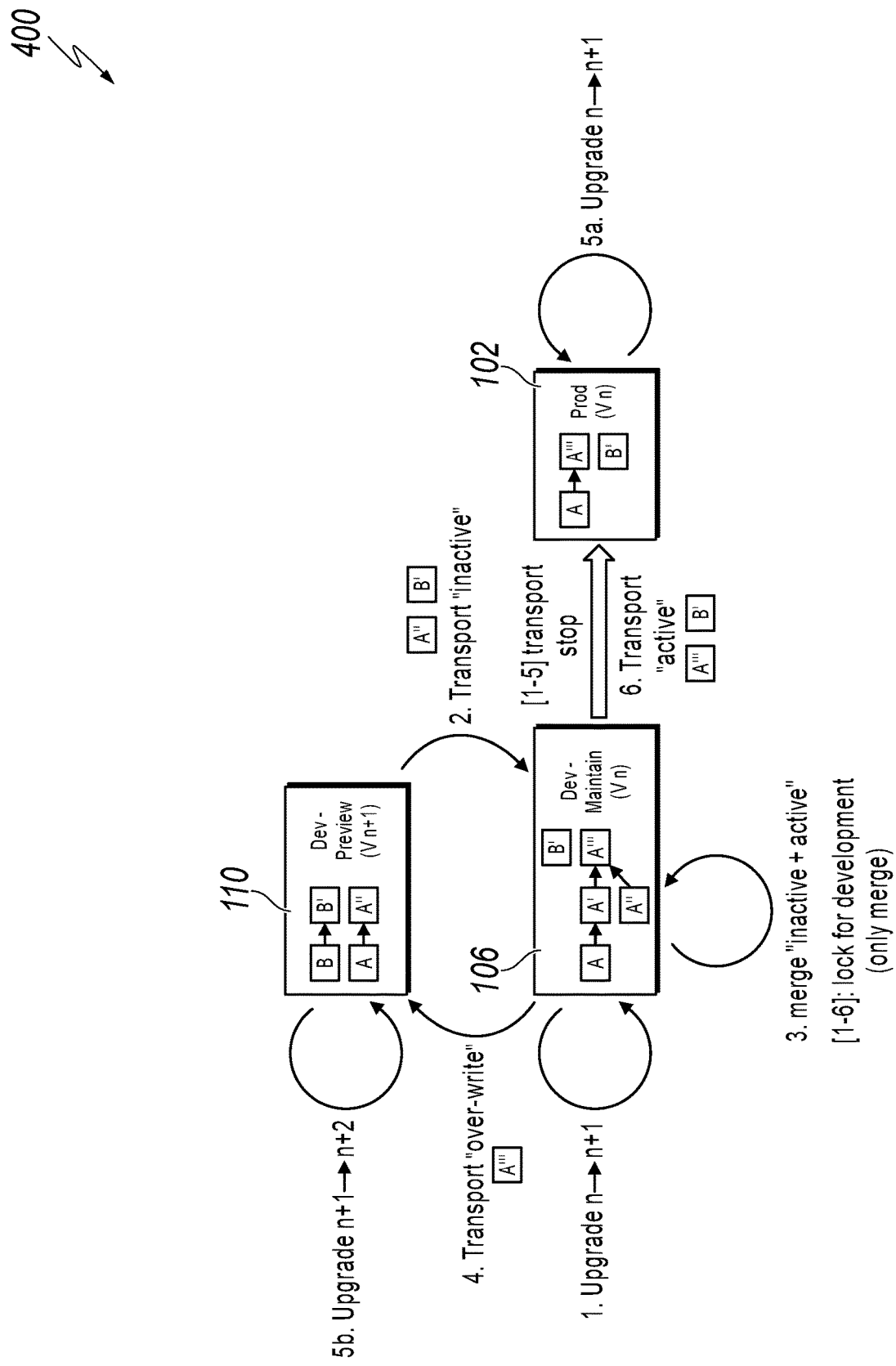
FIG. 4 is a block diagram illustrating an example method of using a data object with the described merge method of FIG. 3, according to an implementation of the present disclosure.

FIG. 4 is a block diagram illustrating an example method 400 of using a data object with the described merge method of FIG. 3, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

For purposes of this example, changes and merges on a data object will be illustrated through the use of a data object A. Prerequisites for this example are that data object A has been created in a release version n, version A' has been changed on release version n, version A" has been changed on release version n+1, version A'" is the merge of A" and A' on release n+1, and A'" is transported to the Prod computing system 102.

At step 1, the Dev-Maintain computing system 106 is upgraded to release n+1. To enable a merge of A' and A", the data objects need to be brought to a computing system on a release version of n+1. Since the Dev-Maintain computing system 106 is upgraded to release version n+1, A' is upgraded to an n+1 release version environment. From step 1, method 400 proceeds to step 2.

At step 2, changes are transported from the Dev-Preview computing system 110 to the Dev-Maintain computing system 106. The changes are an inactive form if the changes collide with changes already performed in the Dev-Maintain computing system 106. The changes are in an active form if the changes do not collide with changes already performed in the Dev-Maintain computing system 106. Here, A" is transported into the Dev-Maintain computing system 106 where A' is considered to be in an inactive format. From step 2, method 400 proceeds to step 3.

At step 3, the transported inactive changes are merged into the Dev-Maintain computing system 106. Since, A" was transported into the Dev-Maintain computing system 106 where A' is considered to be in an inactive format, a three-way merge (A', A", and A'"→A'") can be performed in the Dev-Maintain computing system 106. If the merge requires developer attention, this can be done now. From step 3, method 400 proceeds to step 4.

At step 4, the merged changes (that is, A'") are transported to the Dev-Preview computing system 110 with an "overwrite" parameter set (for example, to true). This ensures that the Dev-Preview computing system 110 also includes the merged version of data objects on the Dev-Maintain computing system 106. From step 4, method 400 proceeds to step 5.

At steps 5a/5b (for example, in parallel with one or more of steps 1-4), a release version upgrade is performed on the Prod computing system 102 to release version n+1 and the Dev-Preview computing system 110 is upgraded to release version n+2. From steps 5a/5b, method 400 proceeds to step 6.

At step 6, once the Prod computing system 102 is on release version n+1, the merged A'" (an active change) can be transported to the Prod computing system 102. A'" can be adjusted (if required) in the Dev-Maintain computing system 106 at a later point-in-time (for example, another modification could be performed on A'", resulting in an A", then the same process executes as with the change to A'. After step 6, method 400 can stop.

Note, to ensure that development on release version n+2 is done based on the merged version, A'" is transported from the Dev-Maintain computing system 106 to the Dev-Preview computing system 110, before the Dev-Preview computing system 110 is upgraded to n+2. Therefore, a transport occurs with the same release version on both start and target computing systems. Also with respect to method 400, in some implementations, a development lock is established for steps 1-6 to permit only merges to take place. Likewise, for steps 1-5a/5b, a transport stop to the Prod computing system 102 is enacted.

Figure 5:
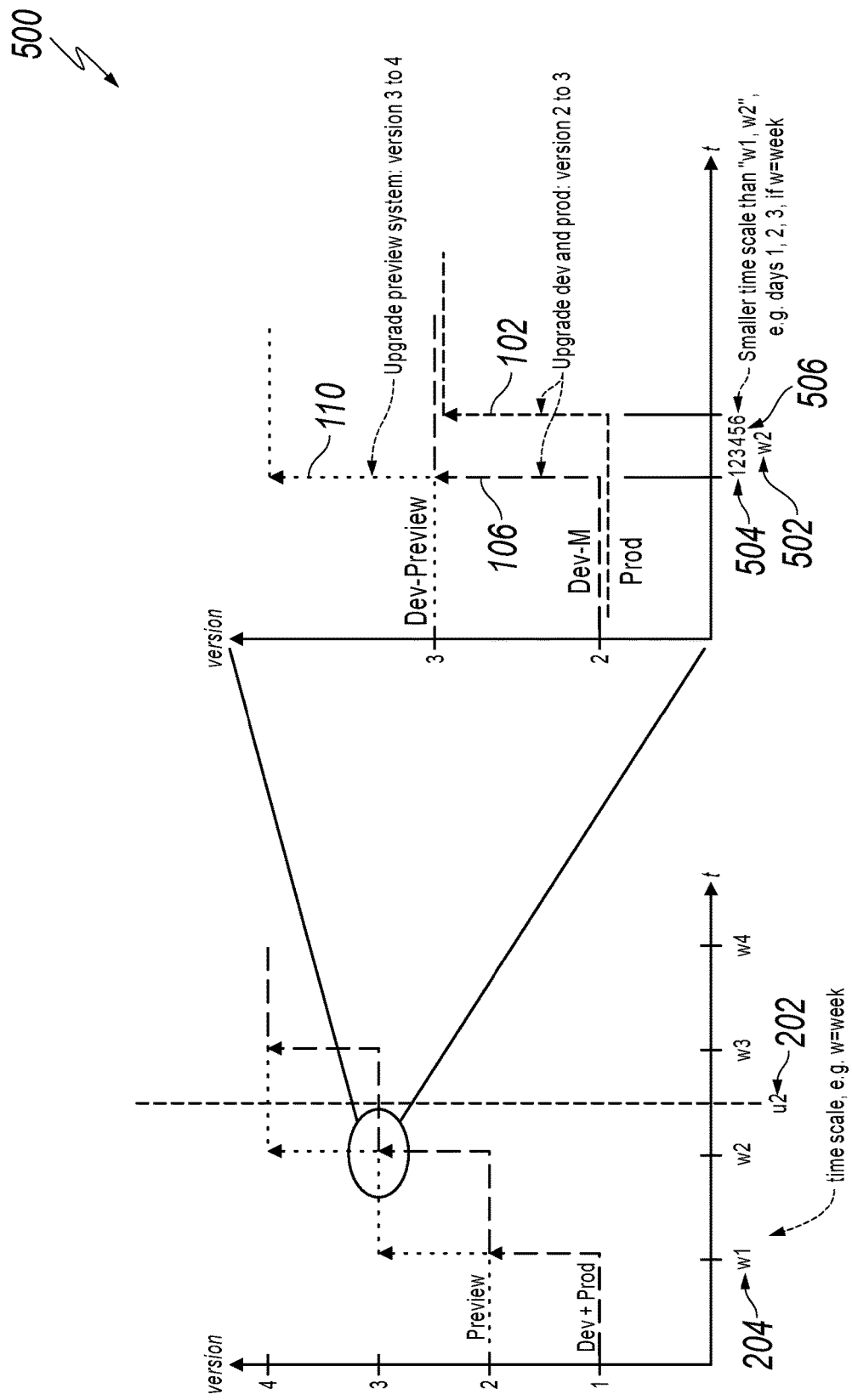
FIG. 5 is a graph illustrating results of the example merge methods of FIGS. 3 and 4, according to an implementation of the present disclosure.

FIG. 5 is a graph 500 illustrating results of the example methods of FIGS. 3 and 4, according to an implementation of the present disclosure. As illustrated in FIG. 5, at time point w2 502, it can be seen that the upgrade of the Dev-Maintain computing system 106 is performed at a point-in-time 1 (504), while the upgrade of the Dev-Preview computing system 110, is performed at point-in-time 5 (506) and the upgrade of the Prod computing system 102 is also performed at point-in-time 5 (506). In an example, if point-in-time w2 502 indicates a week 2, the illustrated points-in-time (that is 1 to 5) can be seen as smaller increments of time (for example, a day or an hour of a day). By this mechanism, an overall time period from 1 to 5 is created, where the Dev-Preview computing system 110 and the Dev-Maintain computing system are both at release version 3, so the transport in step 2 (refer to FIG. 3) from the dev-Preview computing system 110 to the Dev-Maintain computing system 106 can be performed, while the source and the target computing systems are on the same release version.

Figure 6:
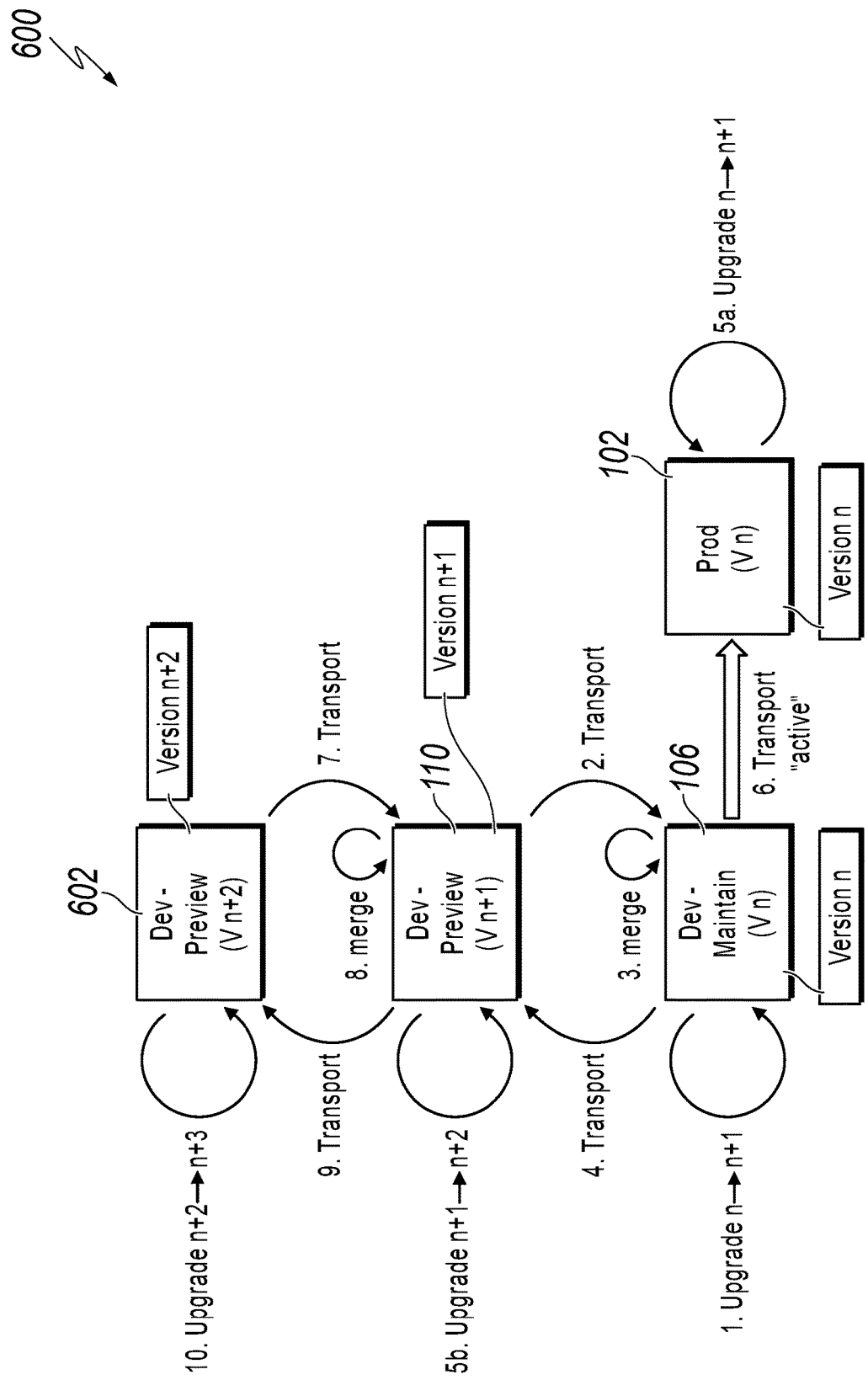
FIG. 6 is a block diagram illustrating an example of a merge method extended to support a second development preview computing system on a release version n+1, according to an implementation of the present disclosure.

FIG. 6 is a block diagram illustrating an example of a merge method 600 extended to support a second Dev-Preview computing system on a release version n+1, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

Following the description of either method 300 or 400 after the Dev-Preview computing system 110 is upgraded to release version n+2 and for a second Dev-Preview computing system 602:

At step 7, changes are transported from the Dev-Preview computing system 602 to the Dev-Preview computing system 110. As in the prior discussion of method 300, the changes are an inactive form if the changes collide with changes performed in the Dev-Preview computing system 110. The changes are in an active form if the changes do not collide with changes performed in the Dev-Preview computing system 110. From step 7, method 600 proceeds to step 8.

At step 8, the transported inactive changes are merged into the Dev-Preview computing system 110. From step 8, method 600 proceeds to step 9.

At step 9, the merged changes are transported to the Dev-Preview computing system 602 with an "overwrite" parameter set (for example, to true). This ensures that the Dev-Preview computing system 602 also includes the merged version of data objects on the Dev-Preview computing system 110. From step 9, method 600 proceeds to step 10.

At step 10, a release version upgrade is performed. Here, the Dev-Preview computing system 602 is upgraded to release version n+3. After step 10, method 600 can stop.

Note that additional steps are required to transport the change from the Dev-Preview computing system 602 to the Prod computing system 102. For example, in the case of a weekly release cycle, the previously-described sequence (including steps 1-6 of FIG) would be performed 1 week later and transport the change now in the Dev-Preview computing system 110 to merge with the Dev-Maintain computing system and to be transported to Prod 102.

Figure 7A:
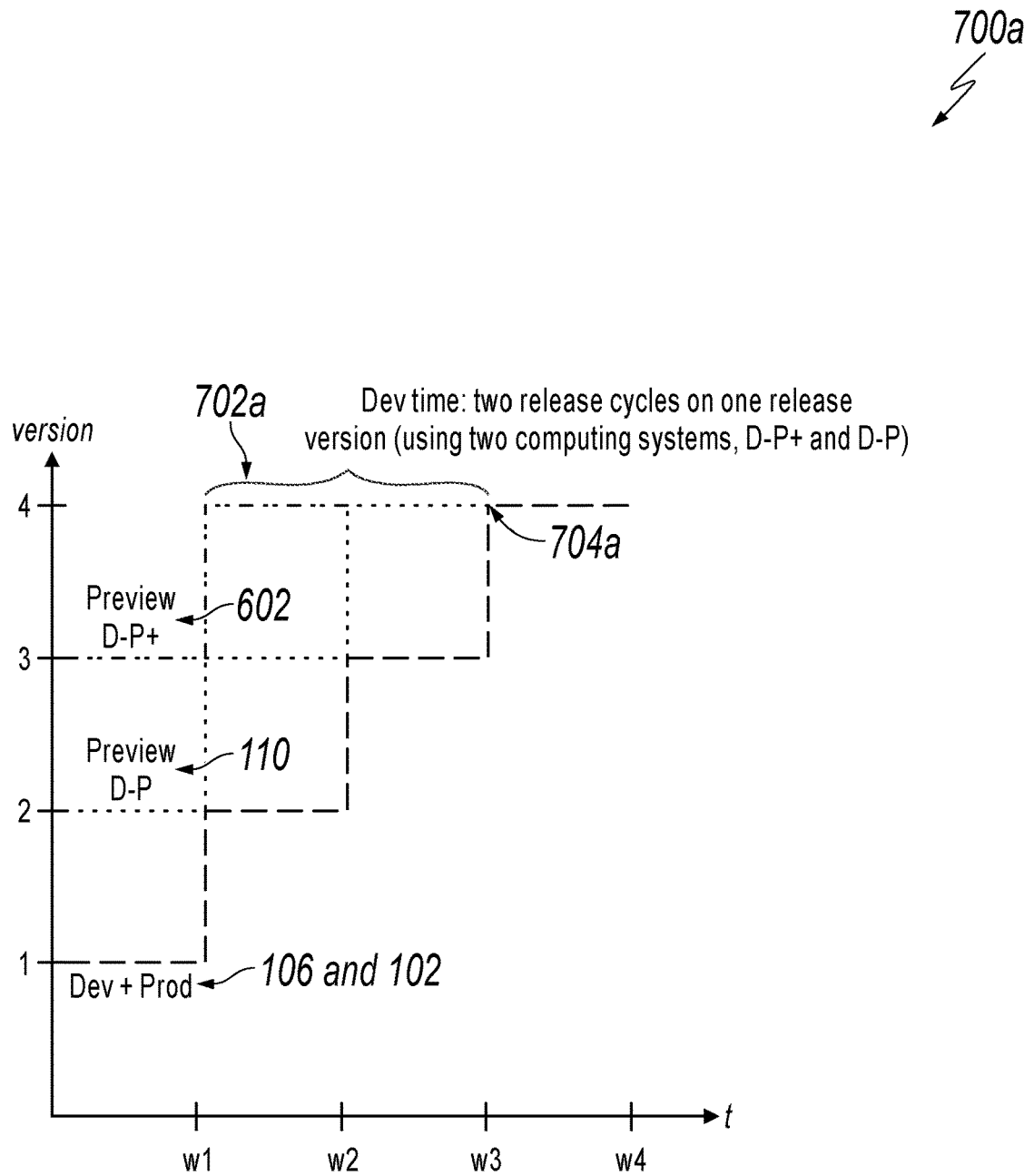
FIG. 7A is a graph illustrating results of the example method of FIG. 6, according to an implementation of the present disclosure.

FIG. 7A is a graph 700a illustrating results of the example method of FIG. 6, according to an implementation of the present disclosure. FIG. 7A illustrates that the described methodology permits development of changes to software/configurations on one release version over a span of two release cycles (that is using two different Dev-Preview computing systems in the process). If a Dev-Preview computing system is two release versions ahead to give developers more time to adjust to a new release version, another Dev-Preview computing system on a yet higher release (for example, Dev-Preview computing system 602) can also be added. In this example, development begins on the Dev-Preview computing system 602 (at release version 4). When the Dev-Preview computing system 602 is upgraded to release version 5, development can continue on the Dev-Preview computing system 110 release version 4. The changes is finally brought from the Dev-Maintain computing system 106 to the Prod computing system 102, once both computing systems are is upgraded to release version 4. The described system landscape and methodology permits twice the time (702a) for creating a change, before the Prod computing system 102 is upgraded with the change (following the upgrade of both the Dev-Maintain computing system 106 to the Prod computing system 102 at 704a).

Figure 7B:
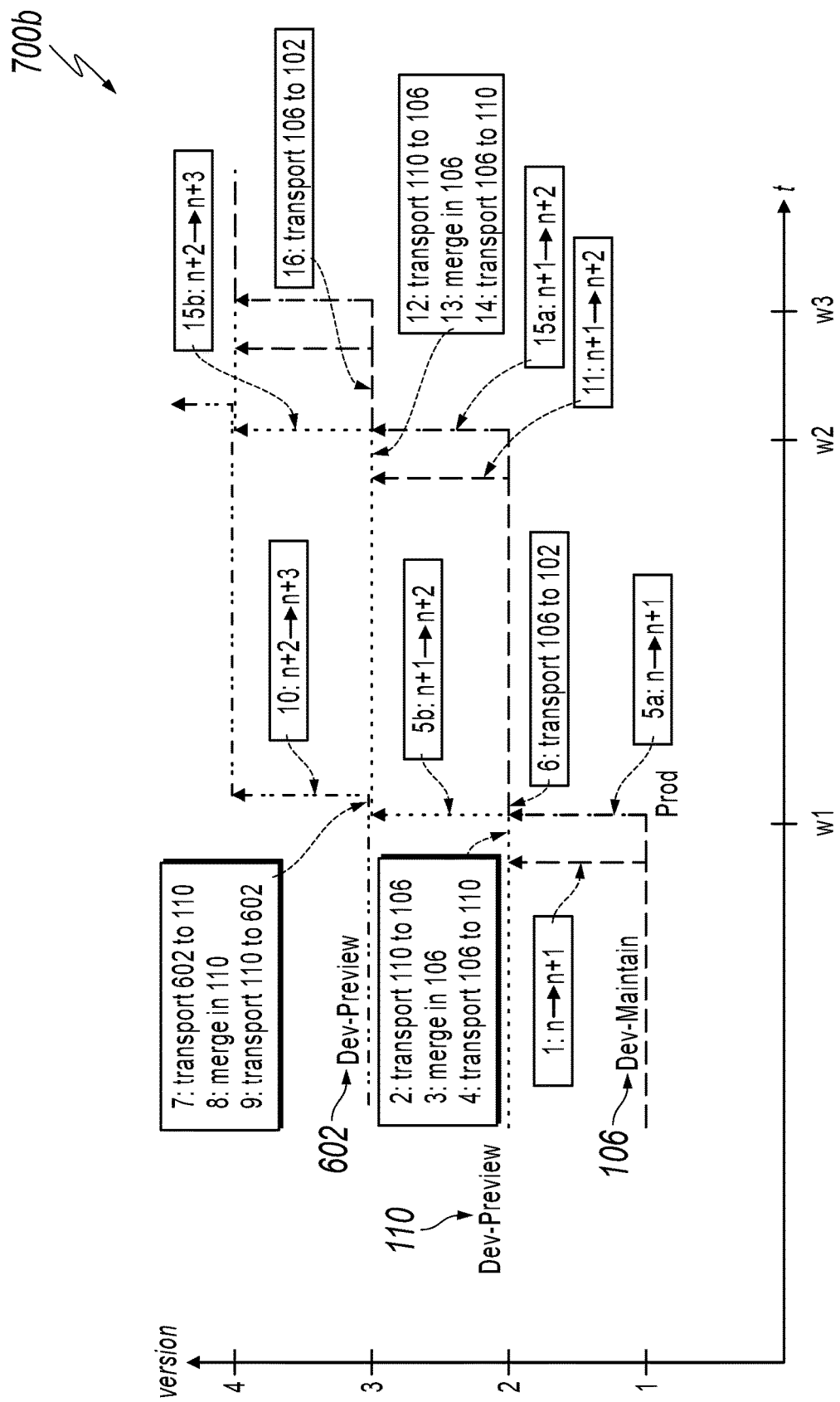
FIG. 7B is a graph illustrating extended results of the example method of FIG. 6, according to an implementation of the present disclosure.

FIG. 7B is a graph 700b illustrating extended results of the example method of FIG. 6, according to an implementation of the present disclosure. FIG. 7B extends method 600 of FIG. 6 (adds steps 11-16) and updates the illustrated graph 700a of results in FIG. 7A.

For example, at step 11, the Dev-Maintain computing system 106 is upgraded to release version n+2. From step 11, method 600 proceeds to step 12.

At step 12, changes are transported from the Dev-Preview computing system 110 to the Dev-Maintain computing system 106. From step 12, method 600 proceeds to step 13.

At step 13, a merge is performed in the Dev-Maintain computing system 106.

From step 13, method 600 proceeds to step 14.

At step 14, the merged changes are transported from the Dev-Maintain computing system 106 to the Dev-Preview computing system 110. From step 14, method 600 proceeds to step 15a.

At step 15a, the Prod computing system 102 is upgraded to release version n+2. From step 15a, method 600 proceeds to 15b.

At 15b, the Dev-Preview computing system 110 is upgraded to release version n+3. From step 15b, method 600 proceeds to step 16.

At step 16, a transport of the merged changes occurs from the Dev-Maintain computing system 106 to the Prod computing system 102. After step 16, method 600 can stop.

Figure 8:
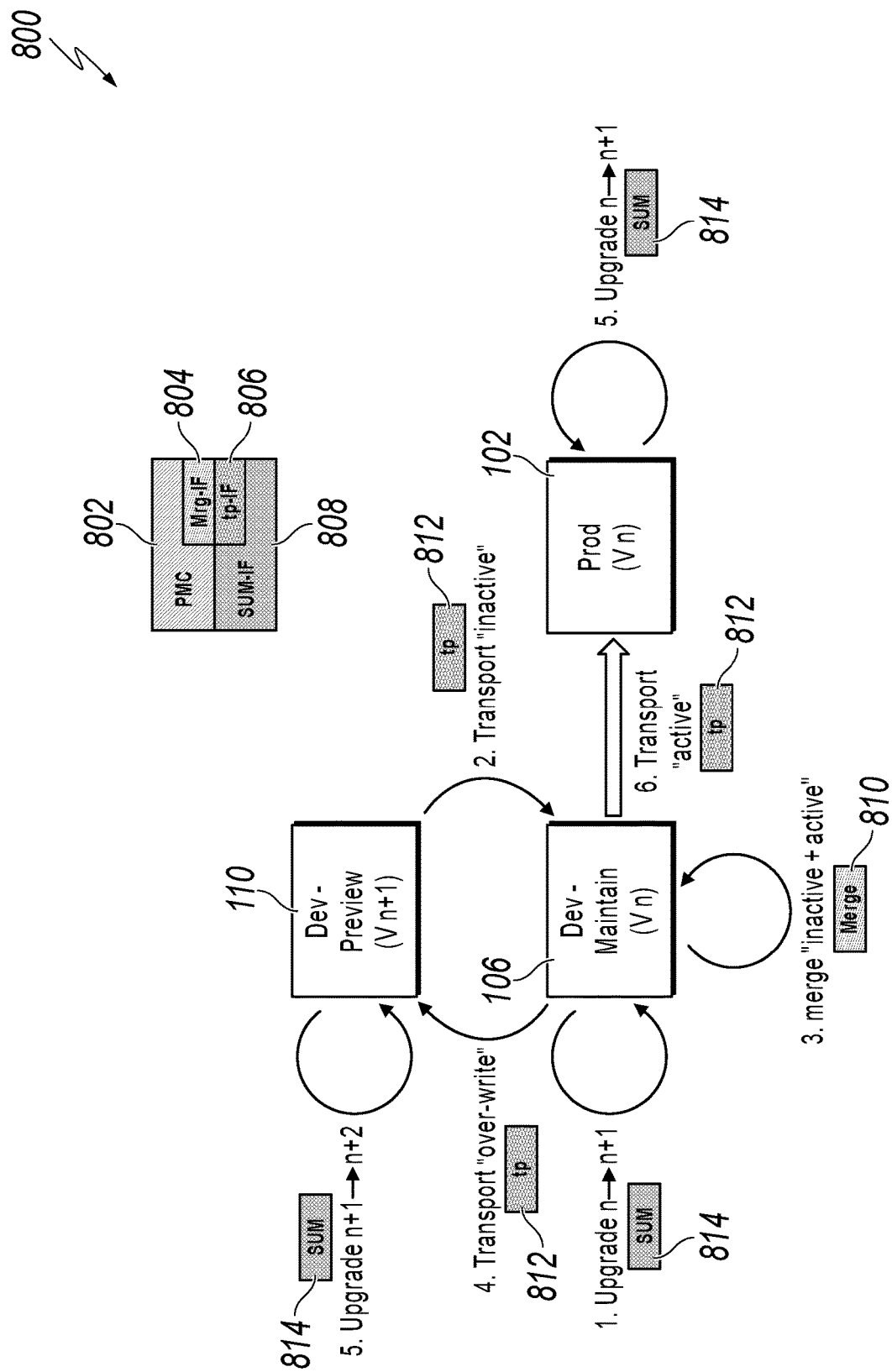
FIG. 8 is a box diagram illustrating the described method of FIG. 3 as orchestrated by a Preview and Maintenance Controller (PMC), according to an implementation of the present disclosure.

FIG. 8 is a box diagram 800 illustrating the described method 300 of FIG. 3 as orchestrated by the PMC, according to an implementation of the present disclosure. In some implementations, the PMC can be deployed as a stand-alone component, to another orchestration infrastructure, or to the Dev-Maintain computing system 106 or the Prod computing system 102. In some implementations, PMC has various interfaces (IF) (for example, a Merge-IF 804, a transport (TP)-IF 806, and an upgrade (SUM (software update manager))-IF 808) to call and to monitor a merge tool 801, a transport tool (tp) 812, and an SUM tool 814, respectively. In some implementations, the Merge tool can monitor for and create user tasks in the Dev-Maintain computing system 106 (for example, using a graphical user interface), if a merge operation is not automatic.

Figure 9:
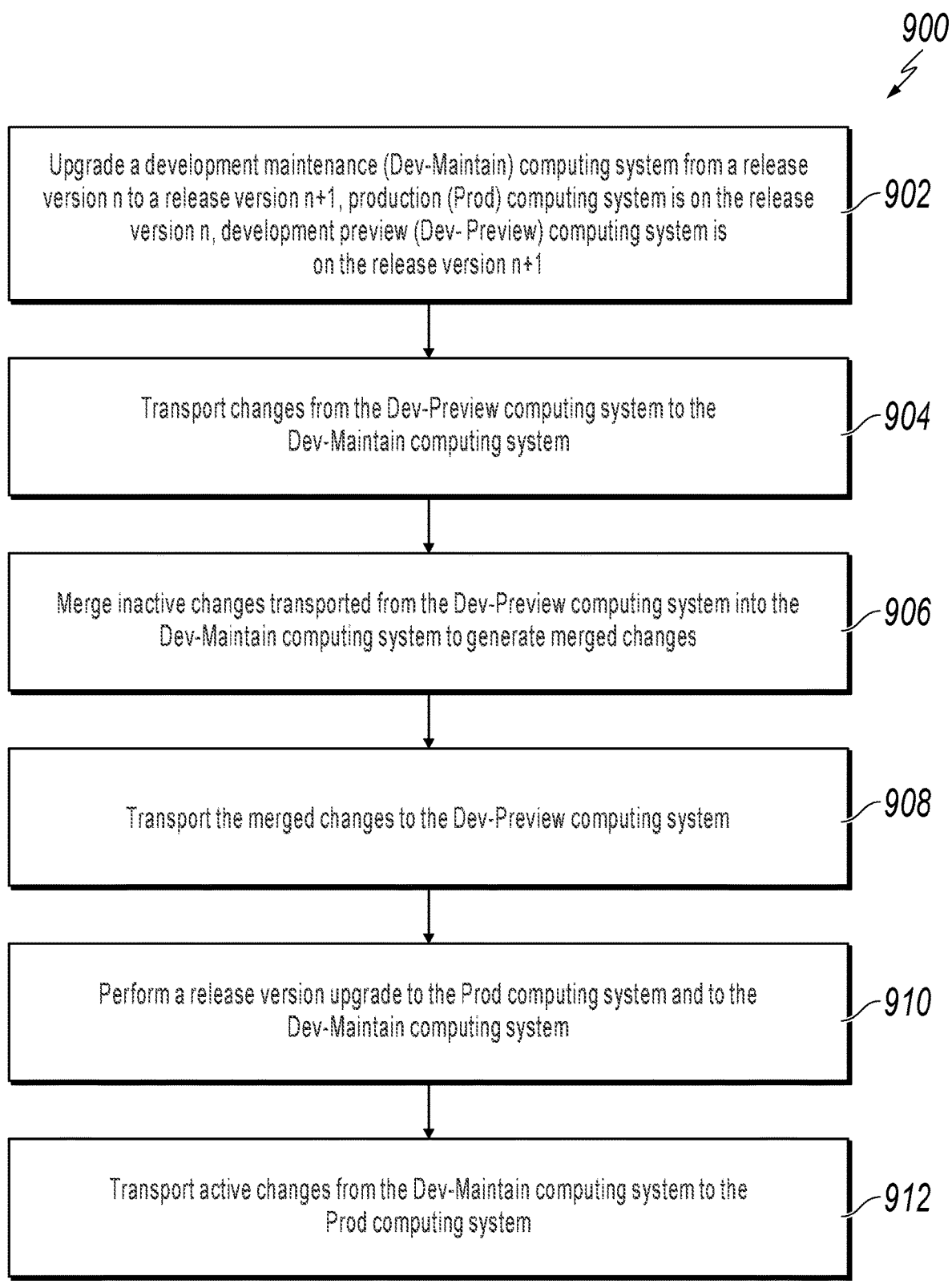
FIG. 9 is a flowchart illustrating an example of a computer-implemented method for synchronization of changes between a two-part development computing system and a production computing system, according to an implementation of the present disclosure.

FIG. 9 is a flowchart illustrating an example of a computer-implemented method for synchronization of changes between a two part development computing system and a Prod computing system, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, a development maintenance (Dev-Maintain) computing system is upgraded from a release version n to a release version n+1, where a production (Prod) computing system is on the release version n, and a development preview (Dev-Preview) computing system is on the release version n+1. From 902, method 900 proceeds to 904.

At 904, changes are transported from the Dev-Preview computing system to the Dev-Maintain computing system. From 904, method 900 proceeds to 906.

At 906, inactive changes transported from the Dev-Preview computing system into the Dev-Maintain computing system are merged to generate merged changes. In some implementations, the changes are an inactive form if the changes collide with changes already performed in the Dev-Maintain computing system and the changes are in an active form if the changes do not collide with changes already performed in the Dev-Maintain computing system. From 906, method 900 proceeds to 908.

At 908, the merged changes are transported to the Dev-Preview computing system. In some implementations, the merged changes are transported to the Dev-Preview computing system with an overwrite parameter set to ensure that the Dev-Preview computing system also includes merged data objects on the Dev-Maintain computing system. From 908, method 900 proceeds to 910.

At 910, a release version upgrade is performed to the Prod computing system and to the Dev-Preview computing system. In some implementations, the release version upgrade upgrades the Prod computing system to the release version n+1 and the Dev-Preview computing system to a release version n+2. In some implementations, following the release version upgrade of the Dev-Preview computing system to the release version n+2, changes are transported from a second Dev-Preview computing system to the Dev-Preview system From 910, method 900 proceeds to 912.

At 912, active changes are transported from the Dev-Maintain computing system to the Prod computing system. After 912, method 900 can stop.

In some implementations and following 912, inactive changes transported from the second Dev-Preview computing system are merged into the Dev-Preview system to generate second merged changes and the second merged changes are transported to the second Dev-Preview computing system. A release version upgrade is then performed on the second Dev-Preview computing system, where the second Dev-Preview computing system is upgraded to a release version n+3.

Figure 10:
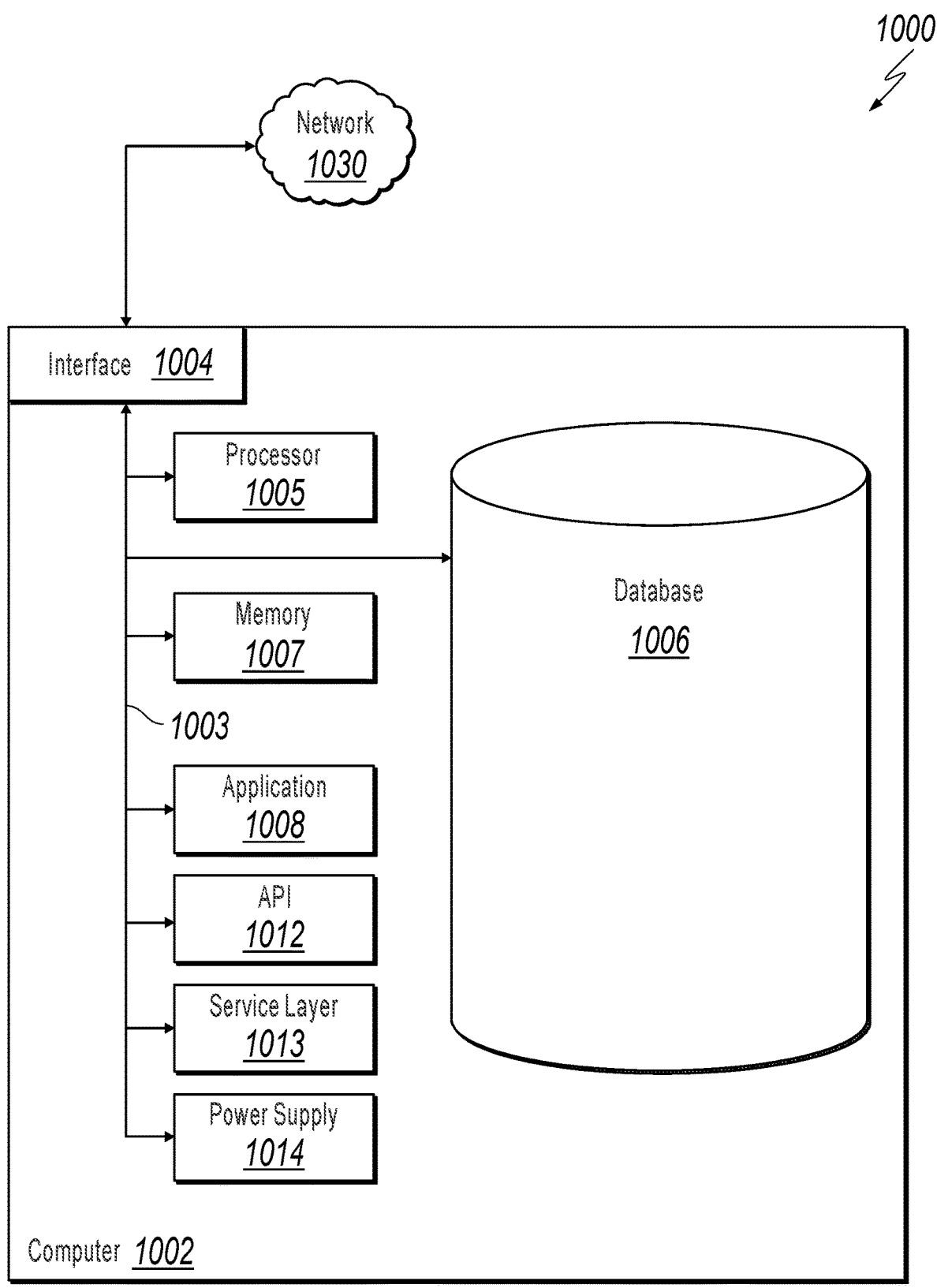
FIG. 10 is a block diagram illustrating an example of a computer-implemented system used to provide computational functionalities associated with described algorithms, methods, functions, processes, flows, and procedures, according to an implementation of the present disclosure.

FIG. 10 is a block diagram illustrating an example of a computer-implemented System 1000 used to provide computational functionalities associated with described algorithms, methods, functions, processes, flows, and procedures, according to an implementation of the present disclosure. In the illustrated implementation, System 1000 includes a Computer 1002 and a Network 1030.

The illustrated Computer 1002 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 1002 can include an input device, such as a keypad, keyboard, or touch screen, or a combination of input devices that can accept user information, and an output device that conveys information associated with the operation of the Computer 1002, including digital data, visual, audio, another type of information, or a combination of types of information, on a graphical-type user interface (UI) (or GUI) or other UI.

The Computer 1002 can serve in a role in a distributed computing system as, for example, a client, network component, a server, or a database or another persistency, or a combination of roles for performing the subject matter described in the present disclosure. The illustrated Computer 1002 is communicably coupled with a Network 1030. In some implementations, one or more components of the Computer 1002 can be configured to operate within an environment, or a combination of environments, including cloud-computing, local, or global.

At a high level, the Computer 1002 is an electronic computing device operable to receive, transmit, process, store, or manage data and information associated with the described subject matter. According to some implementations, the Computer 1002 can also include or be communicably coupled with a server, such as an application server, e-mail server, web server, caching server, or streaming data server, or a combination of servers.

The Computer 1002 can receive requests over Network 1030 (for example, from a client software application executing on another Computer 1002) and respond to the received requests by processing the received requests using a software application or a combination of software applications. In addition, requests can also be sent to the Computer 1002 from internal users (for example, from a command console or by another internal access method), external or third-parties, or other entities, individuals, systems, or computers.

Each of the components of the Computer 1002 can communicate using a System Bus 1003. In some implementations, any or all of the components of the Computer 1002, including hardware, software, or a combination of hardware and software, can interface over the System Bus 1003 using an application programming interface (API) 1012, a Service Layer 1013, or a combination of the API 1012 and Service Layer 1013. The API 1012 can include specifications for routines, data structures, and object classes. The API 1012 can be either computer-language independent or dependent and refer to a complete interface, a single function, or even a set of APIs. The Service Layer 1013 provides software services to the Computer 1002 or other components (whether illustrated or not) that are communicably coupled to the Computer 1002. The functionality of the Computer 1002 can be accessible for all service consumers using the Service Layer 1013. Software services, such as those provided by the Service Layer 1013, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 1002, alternative implementations can illustrate the API 1012 or the Service Layer 1013 as stand-alone components in relation to other components of the Computer 1002 or other components (whether illustrated or not) that are communicably coupled to the Computer 1002. Moreover, any or all parts of the API 1012 or the Service Layer 1013 can be implemented as a child or a sub-module of another software module, enterprise application, or hardware module without departing from the scope of the present disclosure.

The Computer 1002 includes an Interface 1004. Although illustrated as a single Interface 1004, two or more Interfaces 1004 can be used according to particular needs, desires, or particular implementations of the Computer 1002. The Interface 1004 is used by the Computer 1002 for communicating with another computing system (whether illustrated or not) that is communicatively linked to the Network 1030 in a distributed environment. Generally, the Interface 1004 is operable to communicate with the Network 1030 and includes logic encoded in software, hardware, or a combination of software and hardware. More specifically, the Interface 1004 can include software supporting one or more communication protocols associated with communications such that the Network 1030 or hardware of Interface 1004 is operable to communicate physical signals within and outside of the illustrated Computer 1002.

The Computer 1002 includes a Processor 1005. Although illustrated as a single Processor 1005, two or more Processors 1005 can be used according to particular needs, desires, or particular implementations of the Computer 1002. Generally, the Processor 1005 executes instructions and manipulates data to perform the operations of the Computer 1002 and any algorithms, methods, functions, processes, flows, and procedures as described in the present disclosure.

The Computer 1002 also includes a Database 1006 that can hold data for the Computer 1002, another component communicatively linked to the Network 1030 (whether illustrated or not), or a combination of the Computer 1002 and another component. For example, Database 1006 can be an in-memory or conventional database storing data consistent with the present disclosure. In some implementations, Database 1006 can be a combination of two or more different database types (for example, a hybrid in-memory and conventional database) according to particular needs, desires, or particular implementations of the Computer 1002 and the described functionality. Although illustrated as a single Database 1006, two or more databases of similar or differing types can be used according to particular needs, desires, or particular implementations of the Computer 1002 and the described functionality. While Database 1006 is illustrated as an integral component of the Computer 1002, in alternative implementations, Database 1006 can be external to the Computer 1002.

The Computer 1002 also includes a Memory 1007 that can hold data for the Computer 1002, another component or components communicatively linked to the Network 1030 (whether illustrated or not), or a combination of the Computer 1002 and another component. Memory 1007 can store any data consistent with the present disclosure. In some implementations, Memory 1007 can be a combination of two or more different types of memory (for example, a combination of semiconductor and magnetic storage) according to particular needs, desires, or particular implementations of the Computer 1002 and the described functionality. Although illustrated as a single Memory 1007, two or more Memories 1007 or similar or differing types can be used according to particular needs, desires, or particular implementations of the Computer 1002 and the described functionality. While Memory 1007 is illustrated as an integral component of the Computer 1002, in alternative implementations, Memory 1007 can be external to the Computer 1002.

The Application 1008 is an algorithmic software engine providing functionality according to particular needs, desires, or particular implementations of the Computer 1002, particularly with respect to functionality described in the present disclosure. For example, Application 1008 can serve as one or more components, modules, or applications. Further, although illustrated as a single Application 1008, the Application 1008 can be implemented as multiple Applications 1008 on the Computer 1002. In addition, although illustrated as integral to the Computer 1002, in alternative implementations, the Application 1008 can be external to the Computer 1002.

The Computer 1002 can also include a Power Supply 1014. The Power Supply 1014 can include a rechargeable or non-rechargeable battery that can be configured to be either user- or non-user-replaceable. In some implementations, the Power Supply 1014 can include power-conversion or management circuits (including recharging, standby, or another power management functionality). In some implementations, the Power Supply 1014 can include a power plug to allow the Computer 1002 to be plugged into a wall socket or another power source to, for example, power the Computer 1002 or recharge a rechargeable battery.

There can be any number of Computers 1002 associated with, or external to, a computer system containing Computer 1002, each Computer 1002 communicating over Network 1030. Further, the term "client," "user," or other appropriate terminology can be used interchangeably, as appropriate, without departing from the scope of the present disclosure. Moreover, the present disclosure contemplates that many users can use one Computer 1002, or that one user can use multiple computers 1002.

Described implementations of the subject matter can include one or more features, alone or in combination.

For example, in a first implementation, a computer-implemented method, comprising: upgrading a development maintenance (Dev-Maintain) computing system from a release version n to a release version n+1, wherein a production (Prod) computing system is on the release version n, and a development preview (Dev-Preview) computing system is on the release version n+1; transporting changes from the Dev-Preview computing system to the Dev-Maintain computing system; merging inactive changes transported from the Dev-Preview computing system into the Dev-Maintain computing system to generate merged changes; transporting the merged changes to the Dev-Preview computing system; performing a release version upgrade to the Prod computing system and to the Dev-Preview computing system; and transporting active changes from the Dev-Maintain computing system to the Prod computing system.

The foregoing and other described implementations can each, optionally, include one or more of the following features:

A first feature, combinable with any of the following features wherein the changes are an inactive form if the changes collide with changes already performed in the Dev-Maintain computing system and the changes are in an active form if the changes do not collide with changes already performed in the Dev-Maintain computing system.

A second feature, combinable with any of the previous or following features, wherein the merged changes are transported to the Dev-Preview computing system with an overwrite parameter set to ensure that the Dev-Preview computing system also includes merged data objects on the Dev-Maintain computing system.

A third feature, combinable with any of the previous or following features, wherein the release version upgrade upgrades the Prod computing system to the release version n+1 and the Dev-Preview computing system to a release version n+2.

A fourth feature, combinable with any of the previous or following features, further comprising, following the release version upgrade of the Dev-Preview computing system to the release version n+2, transporting changes from a second Dev-Preview computing system to the Dev-Preview system.

A fifth feature, combinable with any of the previous or following features, further comprising: merging inactive changes transported from the second Dev-Preview computing system into the Dev-Preview system to generate second merged changes; and transporting the second merged changes to the second Dev-Preview computing system.

A sixth feature, combinable with any of the previous or following features, further comprising performing a release version upgrade on the second Dev-Preview computing system, wherein the second Dev-Preview computing system is upgraded to a release version n+3.

In a second implementation, a non-transitory, computer-readable medium storing one or more instructions executable by a computer system to perform operations comprising: upgrading a development maintenance (Dev-Maintain) computing system from a release version n to a release version n+1, wherein a production (Prod) computing system is on the release version n, and a development preview (Dev-Preview) computing system is on the release version n+1; transporting changes from the Dev-Preview computing system to the Dev-Maintain computing system; merging inactive changes transported from the Dev-Preview computing system into the Dev-Maintain computing system to generate merged changes; transporting the merged changes to the Dev-Preview computing system; performing a release version upgrade to the Prod computing system and to the Dev-Preview computing system; and transporting active changes from the Dev-Maintain computing system to the Prod computing system.

The foregoing and other described implementations can each, optionally, include one or more of the following features:

A first feature, combinable with any of the following features, wherein the changes are an inactive form if the changes collide with changes already performed in the Dev-Maintain computing system and the changes are in an active form if the changes do not collide with changes already performed in the Dev-Maintain computing system.

A second feature, combinable with any of the previous or following features, wherein the merged changes are transported to the Dev-Preview computing system with an overwrite parameter set to ensure that the Dev-Preview computing system also includes merged data objects on the Dev-Maintain computing system.

A third feature, combinable with any of the previous or following features, wherein the release version upgrade upgrades the Prod computing system to the release version n+1 and the Dev-Preview computing system to a release version n+2.

A fourth feature, combinable with any of the previous or following features, further comprising one or more instructions to, following the release version upgrade of the Dev-Preview computing system to the release version n+2, transport changes from a second Dev-Preview computing system to the Dev-Preview system.

A fifth feature, combinable with any of the previous or following features, further comprising one or more instructions to: merge inactive changes transported from the second Dev-Preview computing system into the Dev-Preview system to generate second merged changes; and transport the second merged changes to the second Dev-Preview computing system.

A sixth feature, combinable with any of the previous or following features, further comprising one or more instructions to perform a release version upgrade on the second Dev-Preview computing system, wherein the second Dev-Preview computing system is upgraded to a release version n+3.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: upgrading a development maintenance (Dev-Maintain) computing system from a release version n to a release version n+1, wherein a production (Prod) computing system is on the release version n, and a development preview (Dev-Preview) computing system is on the release version n+1; transporting changes from the Dev-Preview computing system to the Dev-Maintain computing system; merging inactive changes transported from the Dev-Preview computing system into the Dev-Maintain computing system to generate merged changes; transporting the merged changes to the Dev-Preview computing system; performing a release version upgrade to the Prod computing system and to the Dev-Preview computing system; and transporting active changes from the Dev-Maintain computing system to the Prod computing system.

The foregoing and other described implementations can each, optionally, include one or more of the following features:

A first feature, combinable with any of the following features, wherein the changes are an inactive form if the changes collide with changes already performed in the Dev-Maintain computing system and the changes are in an active form if the changes do not collide with changes already performed in the Dev-Maintain computing system.

A second feature, combinable with any of the previous or following features,

A third feature, combinable with any of the previous or following features, wherein the merged changes are transported to the Dev-Preview computing system with an overwrite parameter set to ensure that the Dev-Preview computing system also includes merged data objects on the Dev-Maintain computing system.

A fourth feature, combinable with any of the previous or following features, wherein the release version upgrade upgrades the Prod computing system to the release version n+1 and the Dev-Preview computing system to a release version n+2.

A fifth feature, combinable with any of the previous or following features, further comprising one or more instructions to, following the release version upgrade of the Dev-Preview computing system to the release version n+2, transport changes from a second Dev-Preview computing system to the Dev-Preview system.

A sixth feature, combinable with any of the previous or following features, further comprising one or more instructions to: merge inactive changes transported from the second Dev-Preview computing system into the Dev-Preview system to generate second merged changes; transport the second merged changes to the second Dev-Preview computing system; and perform a release version upgrade on the second Dev-Preview computing system, wherein the second Dev-Preview computing system is upgraded to a release version n+3.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time,"

or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
upgrading a development maintenance (Dev-Maintain) computing system from a release version n to a release version n+1, wherein a production (Prod) computing system is on the release version n, and a development preview (Dev-Preview) computing system is on the release version n+1;
transporting changes from the Dev-Preview computing system to the Dev-Maintain computing system;
merging inactive changes transported from the Dev-Preview computing system into the Dev-Maintain computing system to generate merged changes;
transporting the merged changes to the Dev-Preview computing system;
performing a release version upgrade to the Prod computing system and to the Dev-Preview computing system; and
transporting active changes from the Dev-Maintain computing system to the Prod computing system, wherein the changes are an inactive form if the changes collide with changes already performed in the Dev-Maintain computing system and the changes are in an active form if the changes do not collide with changes already performed in the Dev-Maintain computing system.

2. The computer-implemented method of claim 1, wherein the merged changes are transported to the Dev-Preview computing system with an overwrite parameter set to ensure that the Dev-Preview computing system also includes merged data objects on the Dev-Maintain computing system.

3. The computer-implemented method of claim 1, wherein the release version upgrade upgrades the Prod computing system to the release version n+1 and the Dev-Preview computing system to a release version n+2.

4. The computer-implemented method of claim 3, further comprising, following the release version upgrade of the Dev-Preview computing system to the release version n+2, transporting changes from a second Dev-Preview computing system to the Dev-Preview system.

5. The computer-implemented method of claim 4, further comprising:
merging inactive changes transported from the second Dev-Preview computing system into the Dev-Preview system to generate second merged changes; and
transporting the second merged changes to the second Dev-Preview computing system.

6. The computer-implemented method of claim 5, further comprising performing a release version upgrade on the second Dev-Preview computing system, wherein the second Dev-Preview computing system is upgraded to a release version n+3.

7. A non-transitory, computer-readable medium storing one or more instructions executable by a computer system to perform operations comprising:
upgrading a development maintenance (Dev-Maintain) computing system from a release version n to a release version n+1, wherein a production (Prod) computing system is on the release version n, and a development preview (Dev-Preview) computing system is on the release version n+1;
transporting changes from the Dev-Preview computing system to the Dev-Maintain computing system;
merging inactive changes transported from the Dev-Preview computing system into the Dev-Maintain computing system to generate merged changes;
transporting the merged changes to the Dev-Preview computing system;
performing a release version upgrade to the Prod computing system and to the Dev-Preview computing system; and
transporting active changes from the Dev-Maintain computing system to the Prod computing system wherein the changes are an inactive form if the changes collide with changes already performed in the Dev-Maintain computing system and the changes are in an active form if the changes do not collide with changes already performed in the Dev-Maintain computing system.

8. The non-transitory, computer-readable medium of claim 7, wherein the merged changes are transported to the Dev-Preview computing system with an overwrite parameter set to ensure that the Dev-Preview computing system also includes merged data objects on the Dev-Maintain computing system.

9. The non-transitory, computer-readable medium of claim 7, wherein the release version upgrade upgrades the Prod computing system to the release version n+1 and the Dev-Preview computing system to a release version n+2.

10. The non-transitory, computer-readable medium of claim 9, further comprising one or more instructions to, following the release version upgrade of the Dev-Preview computing system to the release version n+2, transport changes from a second Dev-Preview computing system to the Dev-Preview system.

11. The non-transitory, computer-readable medium of claim 10, further comprising one or more instructions to:
merge inactive changes transported from the second Dev-Preview computing system into the Dev-Preview system to generate second merged changes; and
transport the second merged changes to the second Dev-Preview computing system.

12. The non-transitory, computer-readable medium of claim 11, further comprising one or more instructions to perform a release version upgrade on the second Dev-Preview computing system, wherein the second Dev-Preview computing system is upgraded to a release version n+3.

13. A computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising:
upgrading a development maintenance (Dev-Maintain) computing system from a release version n to a release version n+1, wherein a production (Prod) computing system is on the release version n, and a development preview (Dev-Preview) computing system k on the release version n+1;
transporting changes from the Dev-Preview computing system to the Dev-Maintain computing system;
merging inactive changes transported from the Dev-Preview computing system into the Dev-Maintain computing system to generate merged changes;
transporting the merged changes to the Dev-Preview computing system;
performing a release version upgrade to the Prod computing system and to the Dev-Preview computing system; and
transporting active changes from the Dev-Maintain computing system to the Prod computing system, wherein the changes are an inactive form if the changes collide with changes already performed in the Dev-Maintain computing system and the changes are in an active form if the changes do not collide with changes already performed in the Dev-Maintain computing system.

14. The computer-implemented system of claim 13, wherein the merged changes are transported to the Dev-Preview computing system with an overwrite parameter set to ensure that the Dev-Preview computing system also includes merged data objects on the Dev-Maintain computing system.

15. The computer-implemented system of claim 13, wherein the release version upgrade upgrades the Prod computing system to the release version n+1 and the Dev-Preview computing system to a release version n+2.

16. The computer-implemented system of claim 15, further comprising one or more instructions to, following the release version upgrade of the Dev-Preview computing system to the release version n+2, transport changes from a second Dev-Preview computing system to the Dev-Preview system.

17. The computer-implemented system of claim 16, further comprising one or more instructions to:

merge inactive changes transported from the second Dev-Preview computing system into the Dev-Preview system to generate second merged changes;

transport the second merged changes to the second Dev-Preview computing system; and perform a release version upgrade on the second Dev-Preview computing system, wherein the second Dev-Preview computing system is upgraded to a release version n+3.

\* \* \* \* \*